(12) United States Patent
Tsui (10) Patent No.: US 9,071,157 B2
(45) Date of Patent: Jun. 30, 2015

(54) HIGH-VOLTAGE (HV) STARTUP DEVICE

(71) Applicant: SYNC POWER CORPORATION, Taipei (TW)

(72) Inventor: Cheng-Wen Tsui, Taipei (TW)

(73) Assignee: Sync Power Corporation, Taipei (TW)

( * ) Notice: Subject to any disclaimer, the term of this patent is extended or adjusted under 35 U.S.C. 154(b) by 158 days.

(21) Appl. No.: 13/923,460

(22) Filed: Jun. 21, 2013

(65) Prior Publication Data
US 2014/0376277 A1 Dec. 25, 2014

(51) Int. Cl.
*H02M 3/335* (2006.01)
*H02M 1/36* (2007.01)

(52) U.S. Cl.
CPC ............ *H02M 1/36* (2013.01); *H02M 3/33523* (2013.01)

(58) Field of Classification Search
CPC ..................... H02M 3/33507; H02M 3/33523; H02M 1/32; H02M 1/36; H02M 2001/0032; H02M 2001/0006; H02M 1/4225; H02M 2001/0058; H02M 3/33515; Y02B 70/1433; Y02B 70/16; Y02B 70/126

USPC .......... 363/21.02–21.18, 49–53, 56.08, 56.11
See application file for complete search history.

(56) References Cited

U.S. PATENT DOCUMENTS

| | | | |
|---|---|---|---|
| 8,085,027 B2 * | 12/2011 | Lin et al. ......................... | 323/300 |
| 2010/0118571 A1 * | 5/2010 | Saint-Pierre ..................... | 363/89 |
| 2011/0069420 A1 * | 3/2011 | Chiu et al. ...................... | 361/91.1 |
| 2011/0182088 A1 * | 7/2011 | Lidak et al. ................. | 363/21.12 |
| 2012/0313616 A1 * | 12/2012 | Lee et al. ....................... | 323/312 |
| 2013/0250627 A1 * | 9/2013 | Herfurth ..................... | 363/21.15 |

* cited by examiner

*Primary Examiner* — Adolf Berhane
*Assistant Examiner* — Henry Lee, III
(74) *Attorney, Agent, or Firm* — Muncy, Geissler, Olds & Lowe, P.C.

(57) ABSTRACT

A high-voltage (HV) startup device is disclosed. The HV startup device is connected with a control circuit of a switching power supply and receives a high voltage to provide and increase a triggering voltage received by the control circuit, wherein the control circuit is a pulse width modulator (PWM) or a pulse frequency modulator (PFM). When the triggering voltage reaches to a preset voltage of the control circuit, the control circuit sends out a control signal and the switching power supply uses the control signal to generate a sense signal. The HV startup device receives the control signal or the sense signal to stop providing the triggering voltage.

21 Claims, 6 Drawing Sheets

HIGH-VOLTAGE (HV) STARTUP DEVICE

BACKGROUND OF THE INVENTION

1. Field of the Invention

The present invention relates to a startup device, particularly to a high-voltage (HV) startup device.

2. Description of the Related Art

Numerous techniques have been used to control switching power supplies. One of the most common is know as pulse width modulation (PWM) in which the switching frequency is held constant while the duty cycle is modulated to control the output. Another common technique is known as pulse frequency modulation (PFM) in which the switch on-time or off-time is held constant, and the frequency is modulated to control the output. In another technique known as hysteretic control (or ripple regulation) frequency and duty cycle are varied so as to keep the output ripple constant.

Figure 1:
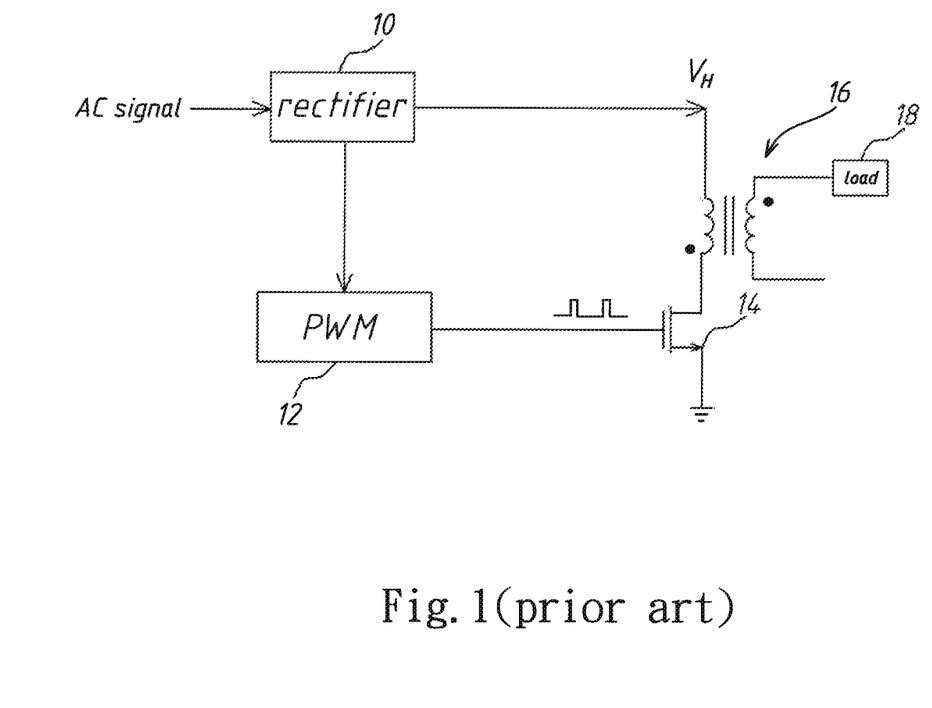
FIG. 1 is a schematic diagram illustrating a switching power supply of the prior art.
Figure 2:
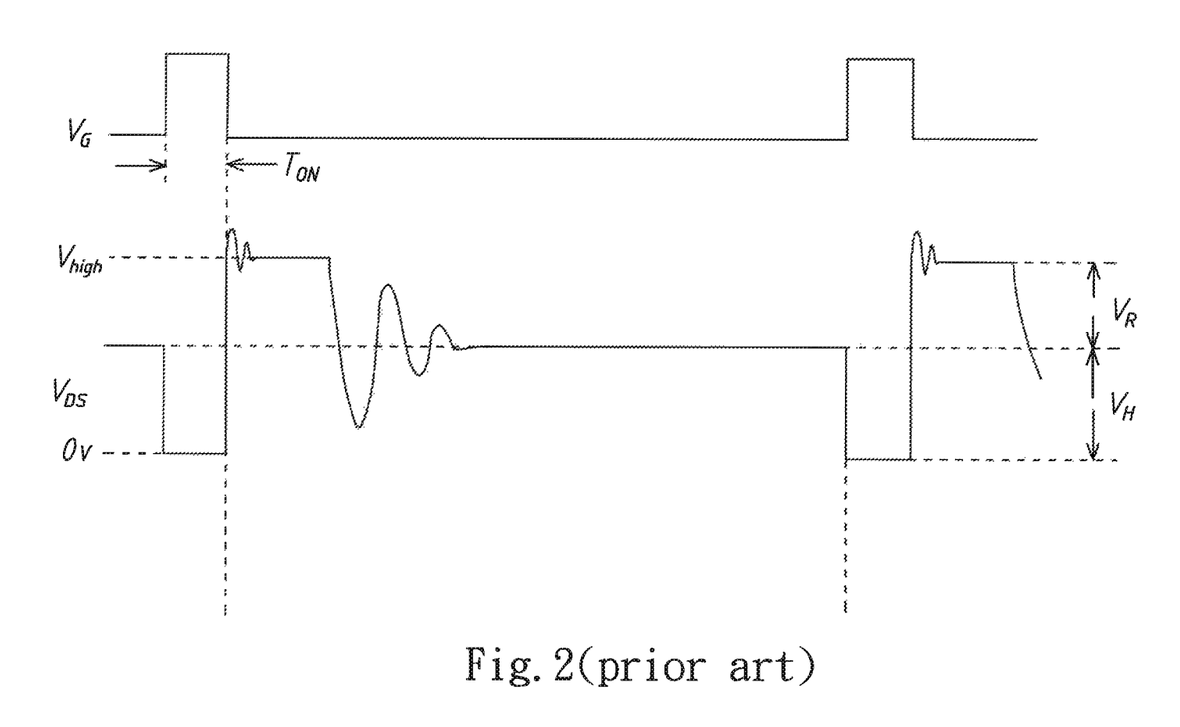
FIG. 2 is a diagram illustrating a pulse width modulation (PWM) signal and $V_{DS}$ in the circuit of FIG. 1.

As shown in FIG. 1 and FIG. 2, a switching power supply of conventional technology includes a rectifier 10, a pulse width modulator (PWM) 12, a switch 14 and a transformer 16 having a primary winding PW and a secondary winding SW and the switch 14 connected to the primary winding PW. The secondary winding SW is connected with a load 18. The rectifier 10 receives an alternating current (AC) signal, and rectifies it to output a direct current (DC) voltage $V_H$ applied to the primary winding PW. The PWM 12 receives a high voltage from the rectifier 10 to output a pulse width modulation (PWM) signal to the switch 14. In other words, the high voltage is used to trigger the PWM 12 to output the PWM signal. A voltage $V_G$ is periodically applied ($T_{ON}$) to the gate of the switch 14 to control the transfer of power from the primary winding PW to the secondary winding SW. When the switch 14 is turned on, the energy is stored in the transformer 16. As the switch 14 is turned off, the stored energy in the transformer 16 is discharged. However, after sending out the PWM signal, the PWM 12 still receives the high voltage from the rectifier 10 to operate, which results in energy loss.

To overcome the abovementioned problems, the present invention provides a high-voltage (HV) startup device, so as to solve the afore-mentioned problems of the prior art.

SUMMARY OF THE INVENTION

A primary objective of the present invention is to provide a high-voltage (HV) startup device, which connects with a control circuit of a switching power supply and receives a high voltage. The startup device provides the power to drive the control circuit. After the control circuit starts sending a control signal, and the voltage converter of the power supply starts to provide power to the control circuit, the startup device stop providing power to the control circuit, to effectively save energy.

To achieve the abovementioned objectives, the present invention provides a high-voltage (HV) startup device, which is connected with a control circuit of a switching power supply and receives a high voltage to provide and increase a triggering voltage received by the control circuit. When the triggering voltage reaches to a preset voltage of the control circuit, the control circuit sends out a control signal and the switching power supply uses the control signal to generate a sense signal. The HV startup device receives the control signal or the sense signal to stop providing the triggering voltage. The HV startup device comprises a comparator with a positive input terminal thereof connecting with a reference voltage terminal and a negative input terminal thereof connecting with the control circuit and a capacitor of the switching power supply connecting with the control circuit. The comparator receives a reference voltage of the reference voltage terminal and either the triggering voltage or zero voltage to send out a switching signal, wherein the reference voltage is lower than the preset voltage. An output terminal of the comparator and the switching power supply connect with a sensor. The sensor, the negative input terminal, the control circuit and the capacitor connect with a switch receiving the high voltage. The switch is designed to have a current capacity approximately same as the current requirement of the control circuit. When the sensor receives the switching signal to turn on the switch using the high voltage to provide and increase the triggering voltage across the capacitor without exceeding the maximum voltage limits of the control circuit. When the sensor receives the switching signal and either the control signal or the sense signal, the sensor turns off the switch so that the switch stops providing the triggering voltage across the capacitor. The switching power supply comprises a main switch and a transformer of a voltage converter. The sense signal, for example, but not limited to converter output voltage, transformer winding voltage and converter switch voltage, drives the sensor to turn off the switch.

Below, the embodiments are described in detail in cooperation with the drawings to make easily understood the technical contents, characteristics and accomplishments of the present invention.

DETAILED DESCRIPTION OF THE INVENTION

Figure 3:
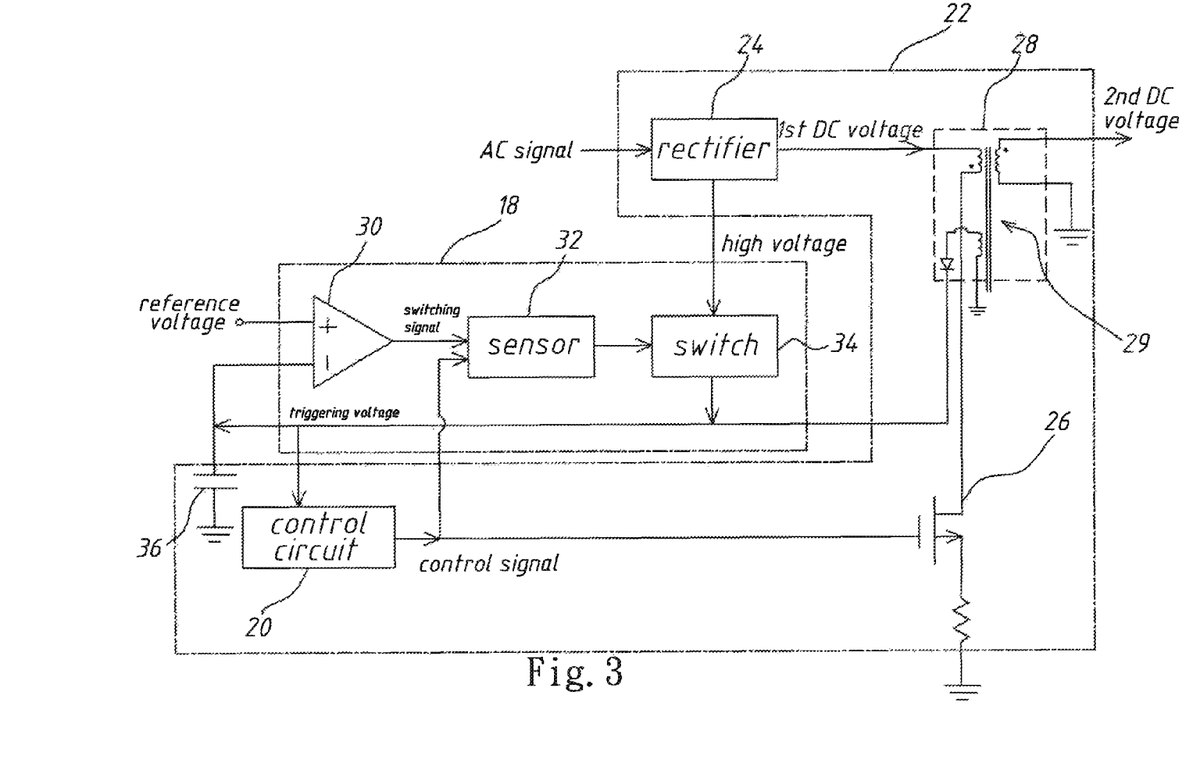
FIG. 3 is a schematic diagram illustrating a high-voltage startup device and a switching power supply according to the first embodiment of the present invention.

The first embodiment of present invention is introduced as below. Refer to FIG. 3. The HV startup device 18 of the present invention connects with a control circuit 20 of a switching power supply 22 and receives a high voltage to provide and increase a triggering voltage received by the control circuit 20. For example, the high voltage is an internal voltage of the switching power supply 22. When the triggering voltage reaches to a preset voltage of the control circuit 20, the control circuit 20 sends out a control signal to the HV startup device 18 whereby the HV startup device 18 stops providing the triggering voltage. In the embodiment, the control circuit 20 is a pulse width modulator (PWM) and the control signal is a pulse width modulation (PWM) signal, or the control circuit 20 is a pulse frequency modulator (PFM) and the control signal is a pulse frequency modulation (PFM) signal.

The switching power supply 22 is realized with all kinds of embodiments. In this embodiment, the switching power supply 22 further comprises a rectifier 24 connecting with the HV startup device 18 and receiving an alternating current (AC) signal to send out the high voltage and a first direct current (DC) voltage. The control circuit 20 connects with a main switch 26, such as an N-channel metal oxide semiconductor field effect transistor (NMOSFET). The main switch 26 receives the control signal to switch a conduction state thereof. The rectifier 24, the main switch 26 and the control circuit 20 connect with a voltage converter 28, such as a step-down transformer or a step-up transformer. The voltage converter 28 receives the first DC voltage, converts the first DC signal into a second direct current (DC) voltage according to the conduction state of the main switch 26, and sends out the second DC voltage. Besides, the switching power supply 22 also comprises a capacitor 36 connecting with the control circuit 20 and the voltage converter 28.

The HV startup device 18 further comprises a comparator 30 with a positive input terminal thereof connecting with a reference voltage terminal and a negative input terminal thereof connecting with the control circuit 20 and the capacitor 36, and receiving a reference voltage of the reference voltage terminal and either the triggering voltage or zero voltage to send out a switching signal, wherein the reference voltage is lower than the preset voltage. An output terminal of the comparator 30 and the control circuit 20 connect with a sensor 32, such as a SR latch. The sensor 32, the rectifier 24, the capacitor 36, the control circuit 20 and the negative input terminal connect with a switch 34 receiving the high voltage. The switch 34 is designed to have a current capacity approximately same as the current requirement of the control circuit 20. When the sensor 32 receives the switching signal to turn on the switch 34 using the high voltage to provide and increase the triggering voltage across the capacitor 36. When the sensor 32 receives the switching signal and the control signal, the sensor 32 turns off the switch 34 so that the switch 34 stops providing the triggering voltage across the capacitor 36, thereby effectively saving energy.

The operation of the first embodiment is introduced as below. Firstly, the rectifier 24 receives the AC signal to send out the high voltage and the first DC voltage. Meanwhile, due to the fact the voltage drop across the capacitor 36 is zero lower than the preset voltage of the control circuit 20, the comparator 30 receives the reference voltage to send out the switching signal to the sensor 32 so that the sensor 32 turns on the switch 34. Then, the switch 34 receives the high voltage to provide the triggering voltage across the capacitor 36. Since the triggering voltage across the capacitor 36 is initially lower than the preset voltage, the switch 34 receives the high voltage to increase the triggering voltage across the capacitor 36 until the triggering voltage reaches to the preset voltage. When the triggering voltage reaches to the preset voltage, the control circuit 20 sends out the control signal. As a matter of fact, the sensor 32 always receives the switching signal. The sensor 32 immediately receives the control signal to turn off the switch 34. Alternatively, after the control circuit 20 sends out the control signal for a period, the sensor 32 receives the control signal to turn the switch 34. The period allows the transformer 29 of the voltage converter 28 to be energized. And, the main switch 26 receives the control signal to switch a conduction state thereof.

The voltage converter 28 receives the first DC voltage, converts the first DC signal into the second DC voltage according to the conduction state of the main switch 26, and sends out the second DC voltage. Since the switch 34 is turned off, the switch 34 stops providing the high voltage. Instead, the voltage converter 28 uses the first DC voltage to charge the capacitor 36 and provide power to the control circuit 20 whereby the control circuit 20 still sends out the control signal.

When the control circuit 20 detects an error of the control signal, the control circuit 20 stops sending out the control signal whereby the voltage converter 28 stops charging the capacitor 36 and providing the power to the control circuit 20. Then, when the voltage drop across the capacitor 36 descends to below the reference voltage, the comparator 30 receives the reference voltage and the voltage drop across the capacitor 36 to drive the sensor 32 to turn on the switch 34. The switch 34 receives the high voltage to provide and increase the triggering voltage across the capacitor 36. When the triggering voltage reaches to the preset voltage, the control circuit 20 sends out the control signal. The following operation have been described previously so will not be reiterated.

In practice and in theory, any signal indicate that the transformer 29 is energized can be sensed and used to turn off the switch 34 except for the control signal.

Figure 4:
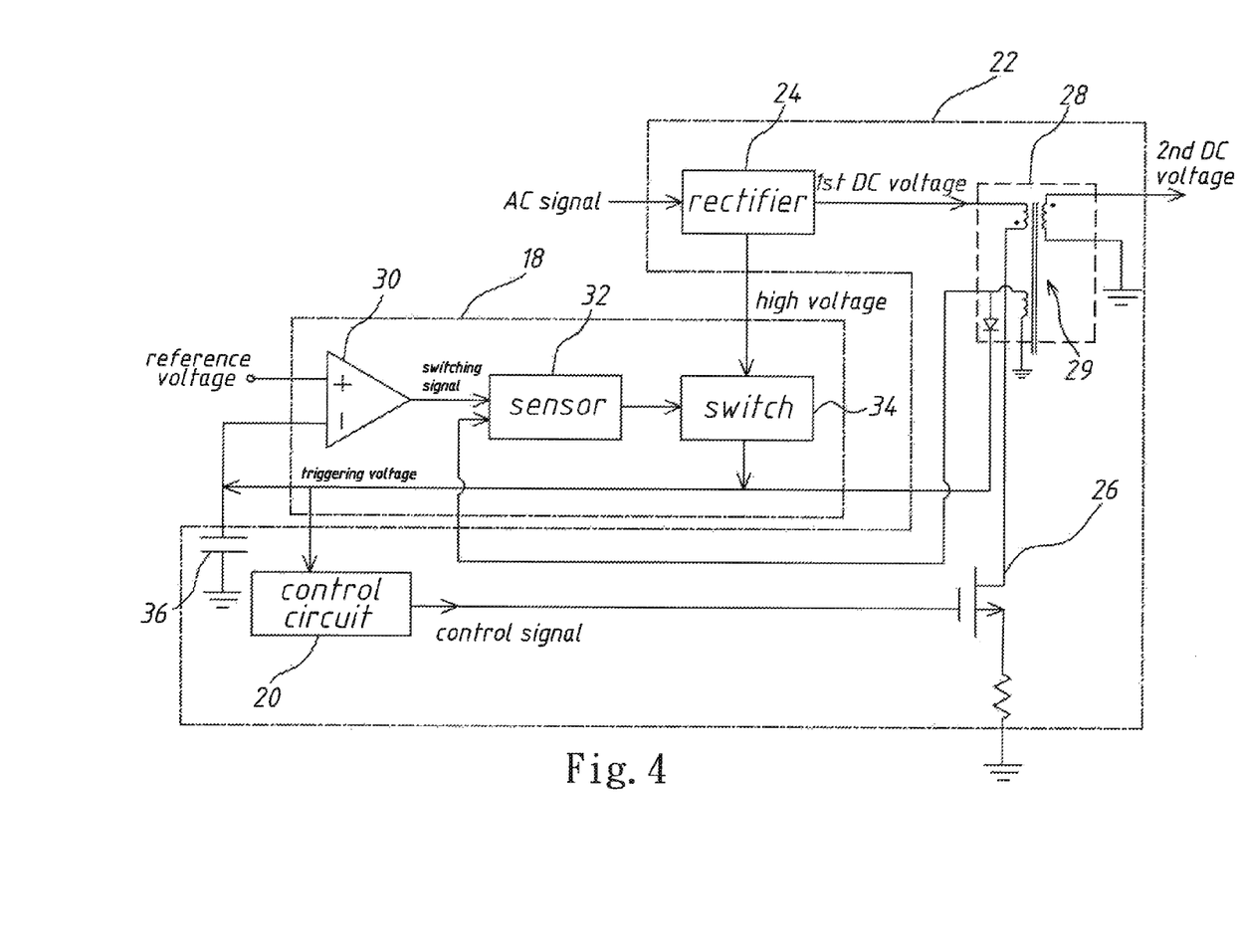
FIG. 4 is a schematic diagram illustrating a high-voltage startup device and a switching power supply according to the second embodiment of the present invention.

The second embodiment of present invention is introduced as below. Refer to FIG. 4. The HV startup device 18 of the present invention connects with a control circuit 20 of a switching power supply 22 and receives a high voltage to provide and increase a triggering voltage received by the control circuit 20. For example, the high voltage is an internal voltage of the switching power supply 22. When the triggering voltage reaches to a preset voltage of the control circuit 20, the control circuit 20 sends out a control signal and the switching power supply 22 uses the control signal to generate a sense signal. The HV startup device 18 receives the sense signal to stop providing the triggering voltage.

The switching power supply 22 further comprises a rectifier 24 connecting with the HV startup device 18 and receiving an AC signal to send out the high voltage and a first DC voltage. The control circuit 20 connects with a main switch 26, such as an NMOSFET. The main switch 26 receives the control signal to switch a conduction state thereof. The rectifier 24, the main switch 26 and the control circuit 20 connect with a voltage converter 28, such as a step-down transformer or a step-up transformer. The voltage converter 28 receives the first DC voltage, converts the first DC signal into a second DC voltage and the sense signal according to the conduction state of the main switch 26, and sends out the second DC voltage and the sense signal. Besides, the switching power supply 22 also comprises a capacitor 36 connecting with the control circuit 20 and the voltage converter 28.

The HV startup device 18 further comprises a comparator 30 with a positive input terminal thereof connecting with a reference voltage terminal and a negative input terminal thereof connecting with the control circuit 20 and the capacitor 36, and receiving a reference voltage of the reference voltage terminal and either the triggering voltage or zero voltage to send out a switching signal, wherein the reference voltage is lower than the preset voltage. An output terminal of the comparator 30 and the voltage converter 28 connect with a sensor 32, such as a SR latch. The sensor 32, the rectifier 24, the capacitor 36, the control circuit 20 and the negative input terminal connect with a switch 34 receiving the high voltage. The switch 34 is designed to have a current capacity approximately same as the current requirement of the control circuit 20. When the sensor 32 receives the switching signal to turn on the switch 34 using the high voltage to provide and increase the triggering voltage across the capacitor 36. When the sensor 32 receives the switching signal and the sense signal, the sensor 32 turns off the switch 34 so that the switch 34 stops providing the triggering voltage across the capacitor 36, thereby effectively saving energy.

The operation of the second embodiment is introduced as below. Firstly, the rectifier 24 receives the AC signal to send out the high voltage and the first DC voltage. Meanwhile, due to the fact the voltage drop across the capacitor 36 is zero lower than the preset voltage of the control circuit 20, the comparator 30 receives the reference voltage to send out the switching signal to the sensor 32 so that the sensor 32 turns on the switch 34. Then, the switch 34 receives the high voltage to provide the triggering voltage across the capacitor 36. Since the triggering voltage across the capacitor 36 is initially lower than the preset voltage, the switch 34 receives the high voltage to increase the triggering voltage across the capacitor 36 until the triggering voltage reaches to the preset voltage. When the triggering voltage reaches to the preset voltage, the control circuit 20 sends out the control signal. And, the main switch 26 receives the control signal to switch a conduction state thereof.

The voltage converter 28 receives the first DC voltage, converts the first DC signal into the second DC voltage and the sense signal according to the conduction state of the main switch 26, and sends out the second DC voltage and the sense signal. The sensor 32 receives the switching signal and the sense signal to turn off the switch 34. Since the switch 34 is turned off, the switch 34 stops providing the high voltage. Instead, the voltage converter 28 uses the first DC voltage to charge the capacitor 36 and provide power to the control circuit 20 whereby the control circuit 20 still sends out the control signal.

When the control circuit 20 detects an error of the control signal, the control circuit 20 stops sending out the control signal whereby the voltage converter 28 stops charging the capacitor 36, providing the power to the control circuit 20 and sending out the sense signal. Then, when the voltage drop across the capacitor 36 descends to below the reference voltage, the comparator 30 receives the reference voltage and the voltage drop across the capacitor 36 to drive the sensor 32 to turn on the switch 34. The switch 34 receives the high voltage to provide and increase the triggering voltage across the capacitor 36. When the triggering voltage reaches to the preset voltage, the control circuit 20 sends out the control signal. The following operation have been described previously so will not be reiterated.

Figure 5:
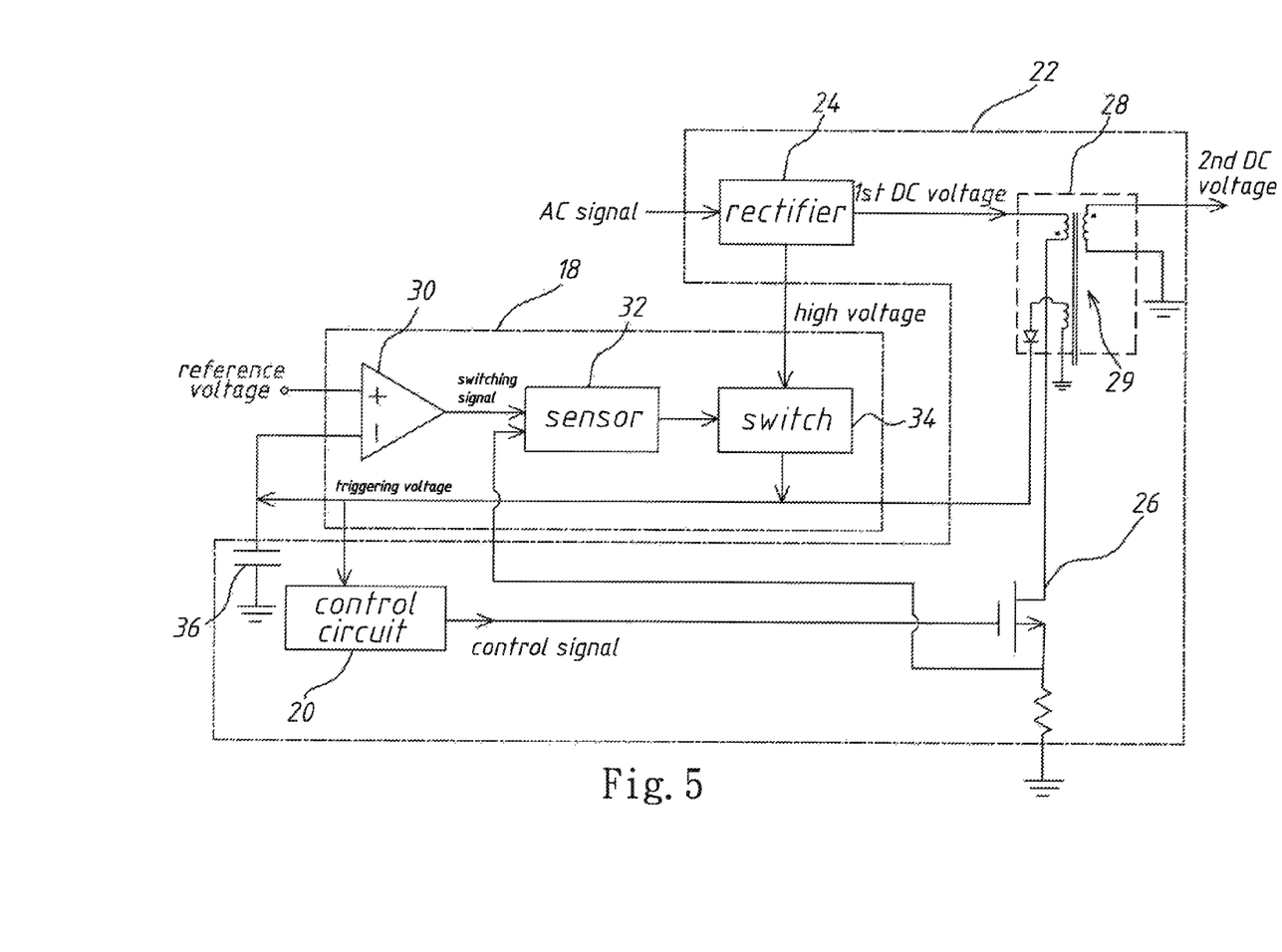
FIG. 5 is a schematic diagram illustrating a high-voltage startup device and a switching power supply according to the third embodiment of the present invention.

The third embodiment of present invention is introduced as below. Refer to FIG. 5. Compared with the second embodiment, the sensor 32 connects with the main switch 26 instead of connecting with the voltage converter 28.

The operation of the third embodiment is introduced as below. Firstly, the rectifier 24 receives the AC signal to send out the high voltage and the first DC voltage. Meanwhile, due to the fact the voltage drop across the capacitor 36 is zero lower than the preset voltage of the control circuit 20, the comparator 30 receives the reference voltage to send out the switching signal to the sensor 32 so that the sensor 32 turns on the switch 34. Then, the switch 34 receives the high voltage to provide the triggering voltage across the capacitor 36. Since the triggering voltage across the capacitor 36 is initially lower than the preset voltage, the switch 34 receives the high voltage to increase the triggering voltage across the capacitor 36 until the triggering voltage reaches to the preset voltage. When the triggering voltage reaches to the preset voltage, the control circuit 20 sends out the control signal. And, the main switch 26 receives the control signal to switch a conduction state thereof and send out the sense signal.

The voltage converter 28 receives the first DC voltage, converts the first DC signal into the second DC voltage according to the conduction state of the main switch 26, and sends out the second DC voltage. The sensor 32 receives the switching signal and the sense signal to turn off the switch 34. Since the switch 34 is turned off, the switch 34 stops providing the high voltage. Instead, the voltage converter 28 uses the first DC voltage to charge the capacitor 36 and provide power to the control circuit 20 whereby the control circuit 20 still sends out the control signal.

When the control circuit 20 detects an error of the control signal, the control circuit 20 stops sending out the control signal whereby the voltage converter 28 stops charging the capacitor 36 and providing the power to the control circuit 20, and whereby the main switch 26 stops sending out the sense signal. Then, when the voltage drop across the capacitor 36 descends to below the reference voltage, the comparator 30 receives the reference voltage and the voltage drop across the capacitor 36 to drive the sensor 32 to turn on the switch 34. The switch 34 receives the high voltage to provide and increase the triggering voltage across the capacitor 36. When the triggering voltage reaches to the preset voltage, the control circuit 20 sends out the control signal. The following operation have been described previously so will not be reiterated.

Figure 6:
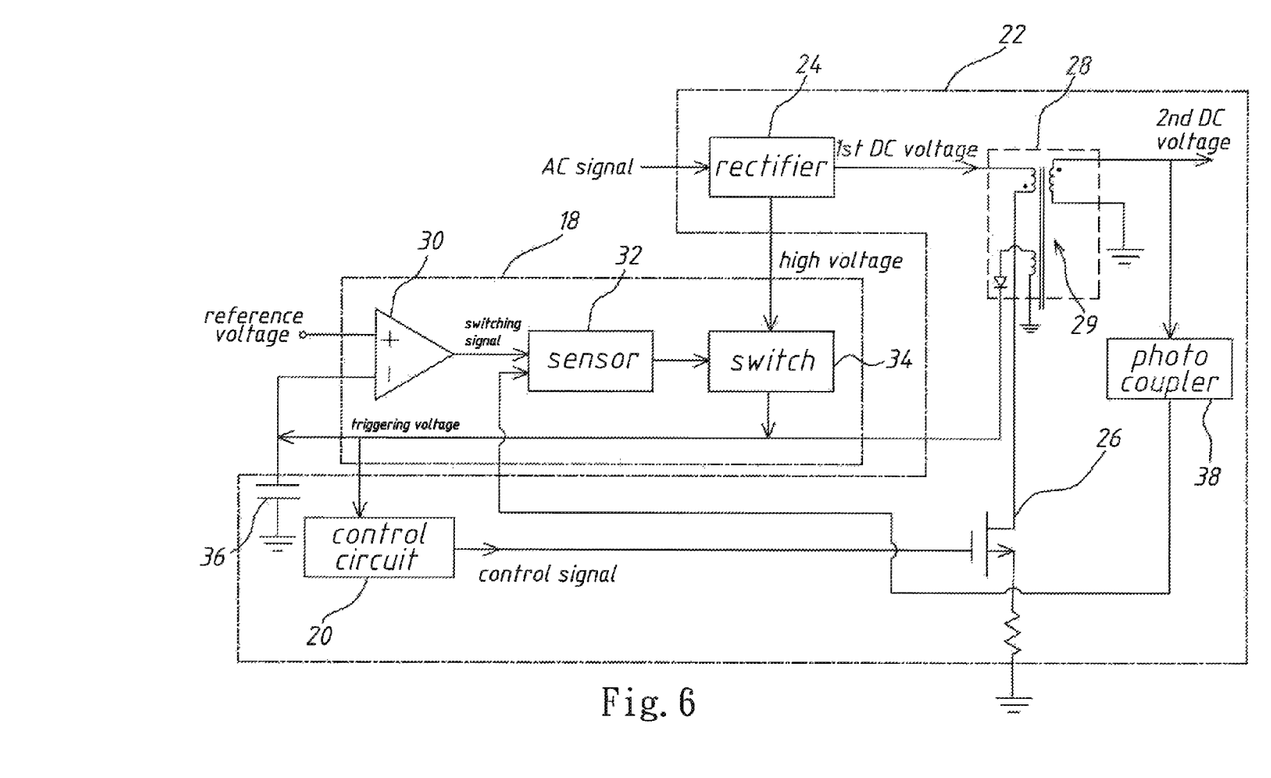
FIG. 6 is a schematic diagram illustrating a high-voltage startup device and a switching power supply according to the fourth embodiment of the present invention.

The fourth embodiment of present invention is introduced as below. Refer to FIG. 6. Compared with the second embodiment, the sensor 32 connects with the voltage converter 28 through a photo coupler 38 instead of directly connecting with the voltage converter 28.

The operation of the fourth embodiment is introduced as below. Firstly, the rectifier 24 receives the AC signal to send out the high voltage and the first DC voltage. Meanwhile, due to the fact the voltage drop across the capacitor 36 is zero lower than the preset voltage of the control circuit 20, the comparator 30 receives the reference voltage to send out the switching signal to the sensor 32 so that the sensor 32 turns on the switch 34. Then, the switch 34 receives the high voltage to provide the triggering voltage across the capacitor 36. Since the triggering voltage across the capacitor 36 is initially lower than the preset voltage, the switch 34 receives the high voltage to increase the triggering voltage across the capacitor 36 until the triggering voltage reaches to the preset voltage. When the triggering voltage reaches to the preset voltage, the control circuit 20 sends out the control signal. And, the main switch 26 receives the control signal to switch a conduction state thereof.

The voltage converter 28 receives the first DC voltage, converts the first DC signal into the second DC voltage according to the conduction state of the main switch 26, and sends out the second DC voltage. The photo sensor 38 receives the second DC signal to sends out the sense signal. The sensor 32 receives the switching signal and the sense signal to turn off the switch 34. Since the switch 34 is turned off, the switch 34 stops providing the high voltage. Instead, the voltage converter 28 uses the first DC voltage to charge the capacitor 36 and provide power to the control circuit 20 whereby the control circuit 20 still sends out the control signal.

When the control circuit 20 detects an error of the control signal, the control circuit 20 stops sending out the control signal whereby the voltage converter 28 stops charging the capacitor 36, providing the power to the control circuit 20 and sending out the second DC voltage. As a result, the photo coupler 38 also stops sending out the sense signal. Then, when the voltage drop across the capacitor 36 descends to below the reference voltage, the comparator 30 receives the reference voltage and the voltage drop across the capacitor 36 to drive the sensor 32 to turn on the switch 34. The switch 34 receives the high voltage to provide and increase the triggering voltage across the capacitor 36. When the triggering voltage reaches to the preset voltage, the control circuit 20 sends out the control signal. The following operation have been described previously so will not be reiterated.

In conclusion, the HV startup device of the present invention can effectively save energy required by the switching power supply. The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A high-voltage (HV) startup device, comprising:
   a comparator with a positive input terminal thereof connecting with a reference voltage terminal and a negative input terminal thereof connecting with a control circuit and a capacitor of a switching power supply connecting with said control circuit, and receiving a reference voltage of said reference voltage terminal and either a triggering voltage or a zero voltage to send out a switching signal, and said reference voltage is lower than a preset voltage;
   a sensor connecting with an output terminal of said comparator and said control circuit; and
   a switch connecting with a sensor, said negative input terminal, said control circuit and said capacitor, and receiving a high voltage, and when said sensor receives said switching signal to turn on said switch using said high voltage to provide and increase said triggering voltage across said capacitor, and when said sensor receives said switching signal and either a control signal or said sense signal, said sensor turns off said switch so that said switch stops providing said triggering voltage across said capacitor, wherein said HV startup device connects with said control circuit of said switching power supply and receives said high voltage to provide and increase said triggering voltage received by said control circuit, and that when said triggering voltage reaches to said preset voltage of said control circuit, said control circuit sends out said control signal and said switching power supply uses said control signal to generate said sense signal, and that said HV startup device receives said control signal or said sense signal to stop providing said triggering voltage.

2. The HV startup device of claim 1, wherein said high voltage is an internal voltage of said switching power supply.

3. The HV startup device of claim 1, wherein after said control circuit sends out said control signal for a period, said sensor receives said control signal.

4. The energy-saving control device of claim 1, wherein said sensor is a SR latch.

5. The HV startup device of claim 1, wherein said switching power supply further comprises:
   a rectifier connecting with said switch and receiving an alternating current (AC) signal to send out said high voltage and a first direct current (DC) voltage;
   a main switch connecting with said control circuit and receiving said control signal to switch a conduction state thereof; and
   a voltage converter connecting with said control circuit, said capacitor, said rectifier and said main switch, receiving said first DC voltage, converting said first DC signal into a second direct current (DC) voltage according to said conduction state, and sending out said second DC voltage.

6. The HV startup device of claim 5, wherein after said control circuit sends out said control signal, said voltage converter uses said first DC voltage to charge said capacitor and provide power to said control circuit whereby said control circuit sends out said control signal.

7. The HV startup device of claim 6, wherein when said control circuit detects an error of said control signal, said control circuit stops sending out said control signal whereby said voltage converter stops charging said capacitor and providing said power to said control circuit, and then a voltage drop across said capacitor descends to below said reference voltage.

8. The HV startup device of claim 5, wherein said main switch is an N-channel metal oxide semiconductor field effect transistor (NMOSFET), and said voltage converter is a step-down transformer or a step-up transformer.

9. The HV startup device of claim 1, wherein said control circuit is a pulse width modulator (PWM) and said control signal is a pulse width modulation (PWM) signal; and said control circuit is a pulse frequency modulator (PFM) and said control signal is a pulse frequency modulation (PFM) signal.

10. The HV startup device of claim 1, wherein said switching power supply further comprises:
    a rectifier connecting with said switch and receiving an alternating current (AC) signal to send out said high voltage and a first direct current (DC) voltage;
    a main switch connecting with said control circuit and receiving said control signal to switch a conduction state thereof; and
    a voltage converter connecting with said control circuit, said capacitor, said rectifier, said main switch and said sensor, receiving said first DC voltage, converting said first DC signal into a second direct current (DC) voltage and said sense signal according to said conduction state, and sending out said second DC voltage and said sense signal.

11. The HV startup device of claim 10, wherein after said control circuit sends out said control signal, said voltage converter uses said first DC voltage to charge said capacitor and provide power to said control circuit whereby said control circuit sends out said control signal.

12. The HV startup device of claim 11, wherein when said control circuit detects an error of said control signal, said control circuit stops sending out said control signal whereby said voltage converter stops charging said capacitor and providing said power to said control circuit, and then a voltage drop across said capacitor descends to below said reference voltage.

13. The HV startup device of claim 10, wherein said main switch is an N-channel metal oxide semiconductor field effect transistor (NMOSFET), and said voltage converter is a step-down transformer or a step-up transformer.

14. The HV startup device of claim 1, wherein said switching power supply further comprises:
    a rectifier connecting with said switch and receiving an alternating current (AC) signal to send out said high voltage and a first direct current (DC) voltage;
    a main switch connecting with said control circuit and said sensor, and receiving said control signal to switch a conduction state thereof and send out said sense signal; and
    a voltage converter connecting with said control circuit, said capacitor, said rectifier, and said main switch, receiving said first DC voltage, converting said first DC signal into a second direct current (DC) voltage according to said conduction state, and sending out said second DC voltage.

15. The HV startup device of claim 14, wherein after said control circuit sends out said control signal, said voltage converter uses said first DC voltage to charge said capacitor and provide power to said control circuit whereby said control circuit sends out said control signal.

16. The HV startup device of claim 15, wherein when said control circuit detects an error of said control signal, said control circuit stops sending out said control signal whereby said voltage converter stops charging said capacitor and providing said power to said control circuit, and then a voltage drop across said capacitor descends to below said reference voltage.

17. The HV startup device of claim 14, wherein said main switch is an N-channel metal oxide semiconductor field effect transistor (NMOSFET), and said voltage converter is a step-down transformer or a step-up transformer.

18. The HV startup device of claim 1, wherein said switching power supply further comprises:
  a rectifier connecting with said switch and receiving an alternating current (AC) signal to send out said high voltage and a first direct current (DC) voltage;
  a main switch connecting with said control circuit and receiving said control signal to switch a conduction state thereof; and
  a voltage converter connecting with said control circuit, said capacitor, said rectifier, said main switch and a photo coupler connecting with said sensor, receiving said first DC voltage, converting said first DC signal into a second direct current (DC) voltage according to said conduction state, and sending out said second DC voltage, and said photo coupler receives said second DC voltage to send out said sense signal to said sensor.

19. The HV startup device of claim 18, wherein after said control circuit sends out said control signal, said voltage converter uses said first DC voltage to charge said capacitor and provide power to said control circuit whereby said control circuit sends out said control signal.

20. The HV startup device of claim 19, wherein when said control circuit detects an error of said control signal, said control circuit stops sending out said control signal whereby said voltage converter stops charging said capacitor and providing said power to said control circuit, and then a voltage drop across said capacitor descends to below said reference voltage.

21. The HV startup device of claim 18, wherein said main switch is an N-channel metal oxide semiconductor field effect transistor (NMOSFET), and said voltage converter is a step-down transformer or a step-up transformer.

* * * * *